May 5, 1942. C. J. OGRAN 2,281,614
CABLE TOOL REAMER
Filed Oct. 7, 1940
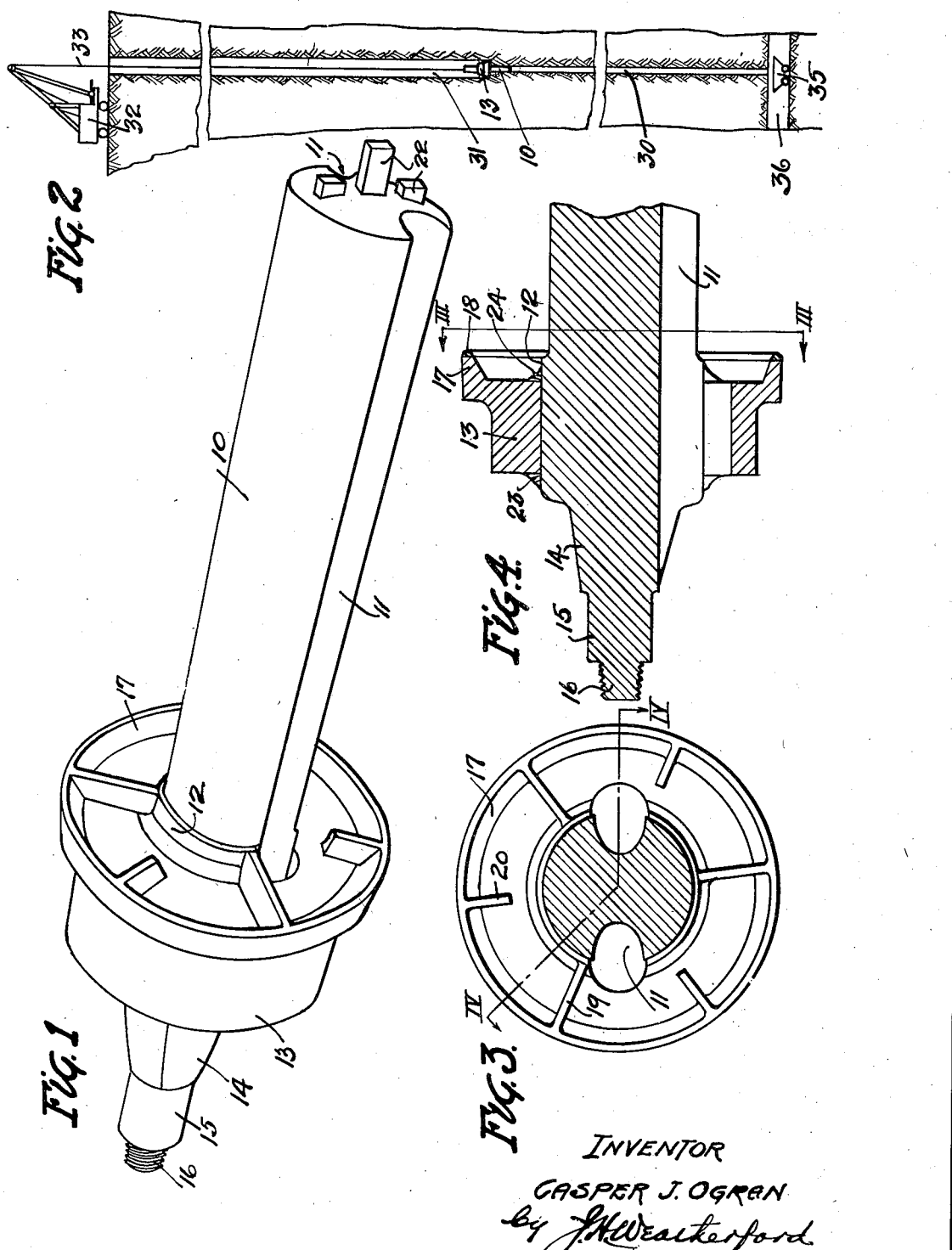
INVENTOR
CASPER J. OGRAN
by J.H. Weatherford
atty Patented May 5, 1942

2,281,614

UNITED STATES PATENT OFFICE 2,281,614

CABLE TOOL REAMER

Casper J. Ogran, Milwaukee, Wis., assignor to Lagne and Bowler, Incorporated, Memphis, Tenn., a corporation of Delaware Application October 7, 1940, Serial No. 360,053

2 Claims. (Cl. 255—73)

This invention relates to cable tool reamers and methods of using same.

In mine work it is often desirable to drill quite large sized holes vertically downward through rock to reach tunnels, drifts or the like in the mines. Work of this kind is ordinarily done by churn drilling; that is, by raising and dropping a drill bit to break up the rock. The chips thus loosened accumulate rapidly cushioning the blows and must be frequently removed, this requiring first the removal of the tool and subsequently the fishing out of the chips. An increase in the size of the hole requires more frequent cleaning out thereof, the tools are much heavier and many difficulties show up which rapidly slow down the work and eventually establish almost prohibitive conditions. Also as the size of the hole increases the tendency to drift off one side or the other and to drill a crooked hole increases very rapidly.

In an endeavor to correct some of these troubles, two diameter bits have been used, the small of the bits maintaining a small bore a fixed distance in advance of the larger hole and serving to concentrate the chips from both bits, rendering their removal somewhat easier, but slowing down both the pilot drilling and the enlarging by concentrating the chips beneath the pilot bit requiring the removal of both structures long before it would have been necessary to remove either had they been used alone.

It has also been known in well boring, to bore a pilot hole in advance and make use of some type of bucket to collect the spoil from a reamer boring tool and to remove this from time to time as condition requires, but such bucket structures obviously require the removal of the reamer to permit the removal of the bucket, thereby also slowing down the work. Additionally and accentuating these things the reamer bit in hard rock is necessarily a massive structure and its removal from deep bores is not only time consuming but power consuming as well.

The present method contemplates the drilling of a pilot bore from the surface to the drift or tunnel below in usual and well known manner with an ordinary type of churn drill and the removal by fishing of the chips churned up by the drill, the size of this pilot hole being kept as small as is reasonably consistent. It also contemplates the enlarging of existing drill holes which are open at the lower end as for the purpose as of permitting stopping at intermediate levels and a convenient discharge of the stope materials into mine cars in drifts therebelow.

The present invention contemplates a tool for accomplishing the reaming of the previously bored hole by the use of such a tool or other reamer.

The objects of the invention are:

To provide a cable tool reamer having guide shank adapted for reciprocation in a bore hole and an integral reamer head having peripheral and radial cutting edges.

To provide a cable tool reamer having a guide shank adapted to contact a major portion of a bore hole and an integral reamer head in which the guide shank is channeled to permit the downward escape of chippings dislodged by the reamer head.

To provide a cable tool reamer having an enlarged reamer head and a concentric guide shank, said shank having a length in excess of the reciprocatory movement of the tool in use and a mass forming a substantial portion of the mass of the entire structure.

The means by which the foregoing and other objects are accomplished and the manner of their accomplishment will readily be understood from the following specification upon reference to the accompanying drawing, in which:

Fig. 1 is a perspective view of the finished tool.

Fig. 2 is a reduced scale sectional elevation of the tool being used for enlarging a bore hole.

Fig. 3 is a sectional end elevation of the tool taken as on the line III—III of Fig. 4; and Fig. 4 is a sectional elevation of the tool taken as on the line IV—IV of Fig. 3.

Referring now to the drawing in which the various parts are indicated by numerals:

10 is a guide shank of substantially cylindrical conformation having oppositely disposed channelways 11 extending throughout its length. Adjacent its upper end this shank has an enlarged collar portion 12 which is adapted to receive a cylindrical reamer head 13, the shank above this collar portion preferably having a reduced portion 14 of substantially rectangular cross section, an adjacent cylindrical portion 15 and a threaded end portion 16 adapted for coupling engagement with a female cable head of usual type, not here shown. The reamer head 13 has an enlarged cylindrical cutter 17 extending continuously therearound, this cutter preferably being faced with a cutting edge 18 of some one of the extremely hard alloys, such as carbaloy or the like. Extending radially inward from the cutter 17 are substantially radial ribs 19 and 20, at least some of which ribs, as the ribs 19 here shown, extend to the collar portion 12, these ribs also preferably being faced with the same extremely hard alloy.

In constructing the tool the guide shank 10, including the grooves 11 therein, is preferably die forged into the grooved cylindrical shape here shown, and the end portions 14, 15 and 16 similarly forged, the portions 15 and 16 and the collar portion 12 being somewhat larger than finished size. Blocks 22 may be welded on to form a lathe grip. The forging is centered in a lathe, the collar portion 12 is turned to accurate cylindrical shape, the portion 15 also ordinarily turned and the tool shank 16 coned and threaded. Should there be unnecessary rough portions along the shank proper these roughnesses may also be turned down although ordinarily the shank is finished with reasonable accuracy by the forging.

The reamer head is then bored, the periphery of the cutter 17 is turned, being preferably coned slightly to a less diameter away from the cutting face, and its cutting face and the cutting faces of the ribs 19, 20 are faced off at right angles to the bore of the head. The hard alloy edge facing 18 is welded along the cutting faces of the cutter 17, and of the ribs 19 and 20.

The bore of the head 13 is made slightly smaller than the outside diameter of the collar 12. The head is heated and is slipped over the collar 12 and is shrunk thereon, and additionally is secured to the collar by welds 23, 24, similar welds also being used where the radial cutters 19 abut the collar 12.

Fig. 2, 30 is a vertical bore hole, 31 the reamed hole, 32 a cable hoist and 33 the cable to the lower end of which the reamer head 13 is attached, the shank 10 being shown depending into the bore hole 30. 35 is a mine car disposed in a mine tunnel to receive chips dislodged in drilling.

In carrying out drilling operations the vertical bore hole 30 adapted to loosely receive the shank 10 is drilled in usual and well known manner, ordinarily by churn drilling, until it reaches the underlying tunnel or drift 36 into which chippings from the reaming may drop.

The reamer shank 10 is lowered into the bore hole 30 and the reamer raised and dropped in manner usual in churn drilling. As the chips are loosened by the peripheral and radial cutters, they are displaced toward the center by the coned inner edge of the peripheral cutter and drop downward through the grooves 11 of the shank and the pilot bore 30 into the car below. In this churning movement the twist of the cable rotates the bit so that not only do the radial cutters strike at constantly changing places but the grooves similarly shift also to new positions and permit discharge of the chips from all areas of the cut. Also the elongated shank serving as a guide compels cutting action to be repeated on obdurate areas of the cut and makes possible the use of a circumferential cutting edge heretofore substantially impossible because of deviations from alinement caused by such hard areas.

It will be understood that while the ideal situation is set up by using or establishing and using a pilot bore open at the bottom end, the tool may also be effectually used with a closed end bore inherent in ordinary well drilling, the pilot bore in such case serving to temporarily store the chips and permit continuity of drilling operation for substantial increments of depth before chip removal becomes necessary and also accumulating and concentrating such chips whereby their removal becomes a much more rapid and efficient operation.

I claim:

1. A cable tool reamer, for enlarging a preformed vertically disposed bore hole, said reamer comprising a head and an integral pilot shank depending below said head and adapted for reciprocation in said bore hole, said head being of circular conformation and having a diameter substantially greater than the diameter of said shank, said head having on its underside an integral downwardly depending peripheral skirt, forming a peripheral cutter, and a plurality of integral radial cutters joined to said skirt and extending inward therefrom toward said shank; said shank being cylindrical, of substantially uniform diameter throughout its length and concentric with said head, and having a length substantially greater than the working stroke of said tool and greatly elongated relatively to the diameter of said bore, a major portion of said shank conforming in size and shape to said bore and said shank having a groove for the discharge of reamer dislodged chips, extending through said head and downward therefrom throughout the full length of said shank.

2. A cable tool reamer, for enlarging a preformed vertically disposed bore hole, said reamer comprising a head and an integral pilot shank having a mass forming a substantial portion of the mass of said tool; said shank depending below said head and being adapted for reciprocation in said bore hole; said head being of circular conformation and having a diameter substantially greater than the diameter of said shank, said head having on its underside an integral downwardly depending peripheral skirt, forming a peripheral cutter, and a plurality of integral radial cutters joined to said skirt and extending inward therefrom toward said shank; said shank being cylindrical, of substantially uniform diameter throughout its length and concentric with said head, and having a length substantially greater than the working stroke of said tool and greatly elongated relatively to the diameter of said bore, a major portion of said shank conforming in size and shape to said bore and said shank having a groove for the discharge of reamer dislodged chips, extending downward from said head throughout the full length of said shank.

CASPER J. OGRAN.